UNITED STATES PATENT OFFICE.

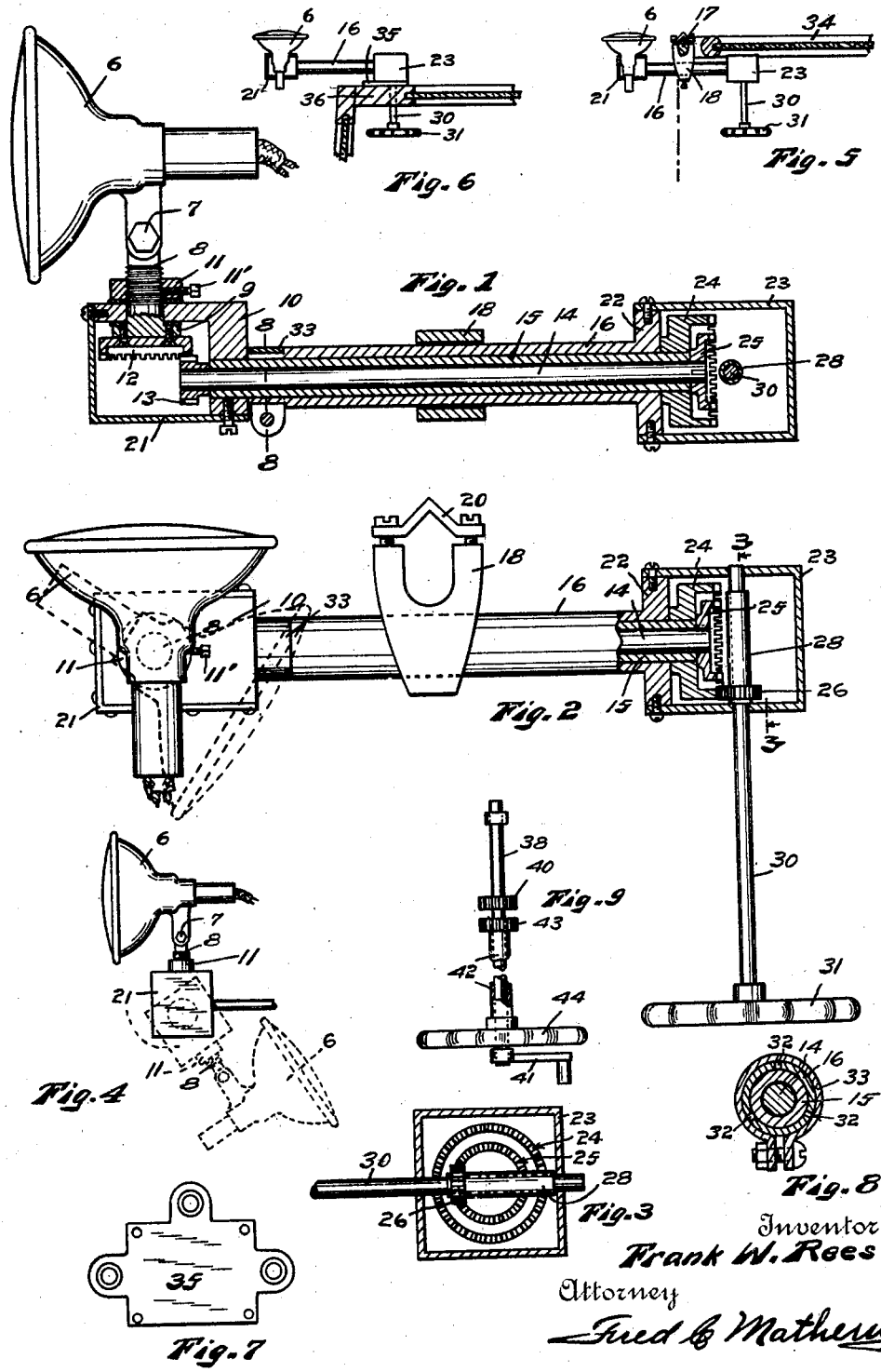

FRANK W. REES, OF SEATTLE, WASHINGTON, ASSIGNOR OF ONE-HALF TO D. H. HOTCHKIN, OF SEATTLE, WASHINGTON.

SPOTLIGHT-LAMP BRACKET.

1,392,850.  Specification of Letters Patent.  Patented Oct. 4, 1921.

Application filed August 5, 1920. Serial No. 401,301.

*To all whom it may concern:*

Be it known that I, FRANK W. REES, a citizen of the United States, residing at Seattle, in the county of King and State of Washington, have invented certain new and useful Improvements in Spotlight-Lamp Brackets, of which the following is a specification.

My invention relates to improvements in brackets for spotlight lamps and the object of my improvement is to provide a bracket having a spotlight lamp at one end and actuating mechanism for such lamp on the other end and adapted to be secured to the front portion of an inclosed motor car body in such a manner that the spotlight lamp will be on the exterior of the car body and the actuating mechanism will be disposed within the interior of the car body.

Another object is to provide a spotlight lamp bracket that is strong and simple in construction, not expensive to manufacture, and that will support a spotlight lamp in such a manner that it may be universally adjusted.

A further and more specific object is to provide a spotlight lamp bracket having a normally horizontal supporting shank that is provided at one end with suitable devices for receiving a spotlight lamp and at the other end with an actuating shaft arranged at substantially right angles thereto and adapted to project within the inclosed portion of a car body to which the bracket is secured.

A still further object is to provide friction devices for preventing the lamp from jarring out of its proper position after it has been adjusted.

With the above and other objects in view the invention consists in the novel construction, adaptation and combination of parts of a universally adjustable spot light lamp bracket as will be more clearly hereinafter described and claimed.

In the accompanying drawings Figure 1 is a view in vertical mid section of a spot light lamp bracket constructed in accordance with my invention, the lamp that is connected therewith being shown in elevation. Fig. 2 is a view partly in plan and partly in cross section of the lamp and bracket, certain positions into which the lamp may be adjusted being indicated by broken lines. Fig. 3 is a view in cross section substantially on a broken line 3, 3 of Fig. 2. Fig. 4 is a view in front elevation on a reduced scale of the lamp and bracket showing by dotted lines certain positions into which the lamp may be adjusted; Fig. 5 is a somewhat diagrammatic view on a reduced scale partly in plan and partly in section showing the device secured to a motor vehicle windshield support of well known type; Fig. 6 is a view similar to Fig. 5 showing the device attached to a permanently inclosed or glassed in car; Fig. 7 is a plan view of a plate that is used for securing the device to the type of windshield shown in Fig. 6; Fig. 8 is a view in cross section on broken line 8, 8 of Fig. 1 and Fig. 9 is a detached view in elevation with parts broken away of a modified form of actuating mechanism that may be used with the device.

Like reference numerals designate like parts throughout the several views.

Referring to the drawings the numeral 6 designates a spot light lamp that is secured by a bolt 7 to a post 8 that is journaled in an angular support 10. The post 8 is provided above the support 10 with a fixed collar 11 that is screwed on to the post and held in adjusted position by a set screw 11'. The bottom end of the post 8 is provided with a rigid head 9 to which is secured a crown wheel 12 that meshes with a spur gear 13 on a shaft 14.

The shaft 14 is journaled within a sleeve 15 and the angular support 10 is rigidly secured to sleeve 15 and is arranged to be turned by rotation of such sleeve. The sleeve 15 is journaled within a tubular shank 16 that may be rigidly secured to a windshield support 17 by a bracket 18 having a separate clamp member 20 by which it may be made fast to the wind shield support 17.

A rectangular housing 21 is secured to the angular support 10 for the purpose of inclosing the gear 12 and pinion 13.

The inner end of the shank 16 is integral with or otherwise rigidly secured to a plate 22 to which is secured a rectangular housing 23.

The end of the sleeve 15 projects into the housing 23 and has a crown wheel 24 fixedly secured thereon. The end of the shaft 14 projects outwardly from the end of the sleeve 15 and has a smaller crown wheel 25 rigidly secured thereto, the crown wheel 25 being disposed within the gearwheel 24 as more clearly shown in Figs. 1, 2 and 3.

The crown wheels 24 and 25 are arranged to be selectively engaged by a spur gear 26 on a sleeve 28 that is rigidly secured to a normally horizontal actuating shaft 30 that is arranged at right angles to the shaft 14 and sleeve 15. The actuating shaft 30 is journaled within the housing 23 and is provided on its outer end with a handwheel 31 by which it may be turned.

The sleeve 28 is shorter than the distance between the two sides of the housing 23 and serves as a stop which limits the endwise movement of such sleeve. When the sleeve 28 is in the position shown in Fig. 3 the spur gear 26 will be in mesh with the crown wheel 25 and out of mesh with the gear wheel 24 so that rotation of the actuating shaft 30 will turn the post 8 and thereby turn the lamp 6 into various angular positions as indicated in Fig. 2. When the sleeve 28 is moved into the position shown in Fig. 2 the spur gear 26 will be moved into mesh with the gearwheel 24 and out of mesh with the crown wheel 25 so that when the actuating shaft 30 is turned the lamp will be rotated around the axis of the shaft 14 and sleeve 15 as indicated in Fig. 4.

Universal adjustment of the lamp may be secured in an obvious manner by the combined movements of the sleeve 15 and post 8.

The friction between the collar 11, head 9 and angular support 10 may be varied by adjusting the position of the collar 11 which collar will ordinarily be set tight enough to prevent the post 8 from being turned out of adjustment by the jolting of the car but not tight enough to prevent the post 8 from being turned by applying ordinary force to the handwheel 31.

The outer end of the tubular shank 16 is preferably machined to a smaller external diameter than the remainder of such shank, see Figs. 1 and 8, and is slotted as at 32 so that the said end may be compressed by a clamp 33 into frictional engagement with the sleeve 15 to thereby hold such sleeve against being turned by the jolting or jarring of a car after it has been adjusted.

In use on an ordinary type of motor vehicle the device may be securely clamped to the support 17 of a windshield 34 see Fig. 5, so that the bracket will be substantially parallel with, and on the inner side of the windshield and the actuating shaft 30 will project outwardly toward the driver where the hand wheel 31 may readily be grasped for the purpose of turning the actuating shaft 30 and adjusting the lamp 6.

When the device is to be used on a permanently inclosed car body, the bracket member 18 is dispensed with, and a plate 35, see Figs. 6 and 7, is secured to one side of the housing 23 and is then secured by means of bolts or screws, not shown to an upright wooden frame member 36 of the type commonly used at the corner adjacent the windshield or glass front of an inclosed car body, and the actuating shaft 30 is allowed to project through a suitable hole in the frame member 36 into the interior of the car body.

When the post 6 is in a vertical position and is rotated by meshing the spur gear 26 with the crown wheel 25 and turning the actuating bar 30 the focal axis of the lamp will be moved in a horizontal plane but if the post 6 is thus rotated when it is other than vertical the focal axis of the lamp will describe movement in another plane which is always substantially at right angles to the axis of the post 6.

By placing the actuating shaft 30 at substantially right angles to the shaft 14 and sleeve 15 it is possible to mount the spot light lamp bracket on either the outside or inside of a car body at the location of the windshield and to have the actuating mechanism therefor project within the car body without any extensive alterations of the several parts of the car body. When the device is used on curtained cars the shank 16 may project through between the edge of the curtain and the windshield and when the device is used on cars that are permanently inclosed or glassed in it will only be necessary to bore a single hole through the corner frame piece through which the shaft 30 may project.

The gear devices comprising the spur gear 26 which may be selectively moved into engagement with the crown wheels 24 and 25 make it possible to rotate the post 6 and the angular supporting member 10 by the use of the single shaft 30 but if a separate actuating means for each of the crown wheels 24 and 25 is desired it may be had by providing a shaft 38, see Fig. 9, having at its inner end a spur gear 40 adapted to mesh with the crown wheel 25 and at its outer end a crank 41 or similar device by which it may be turned and by providing on such shaft 38 a sleeve 42 having at its inner end a spur gear 43 arranged to mesh with the crown wheel 24 and at its outer end a handwheel 44 by which it may be turned.

From the foregoing description taken in connection with the accompanying drawings the form of construction and method of operation of this spotlight lamp bracket will be readily apparent, but, while I have described the principle of operation of the invention together with the device which I now consider to be the best embodiment thereof it will be understood that the structure shown is merely illustrative and that such changes may be made as are within the scope of the following claims:

What I claim is:

1. In a device of the class described, a normally horizontal tubular shank arranged to be secured to one side of an inclosed motor vehicle body adjacent the edge of the wind shield, telescoping members extending lengthwise within said shank, a spotlight lamp adjustably supported at the outer end of the outer telescopic member, a crown wheel carried by the lamp, a spur gear carried by the inner telescoping member in mesh with the crown wheel, crown wheels secured to the inner ends of said telescoping members, an actuating shaft extending crosswise of said shank adjacent the last named crown wheels and arranged to project within said inclosed motor vehicle body, and a spur gear on said actuating shaft arranged to be selectively moved into mesh with either of said last named crown wheels for rotating said telescopic members.

2. In a device of the class described a normally horizontal tubular shank, means for securing said shank to the windshield support of a motor vehicle, a sleeve rotatable within said shank, a support secured to the outer end of said sleeve, a post journaled in said support at right angles to said sleeve, a spotlight lamp secured to said post, a shaft rotatable within said sleeve, gear mechanism connecting the outer end of said shaft with said post, a shiftable actuating shaft disposed crosswise of said sleeve and said shaft at the inner end thereof and gear mechanism for selectively connecting said actuating shaft with either said sleeve or said shaft to effect rotation of the same by the turning of said actuating shaft.

3. In a device of the class described a normally horizontal tubular shank, means for securing said shank to the windshield support of a motor vehicle, a sleeve rotatable within said shank, a support secured to the outer end of said sleeve, a post journaled in said support at right angles to said sleeve, a spotlight lamp secured to said post, a shaft rotatable within said sleeve, gear mechanism connecting the outer end of said shaft with said post, a crown wheel on the inner end of said sleeve, a smaller crown wheel on the inner end of said shaft and disposed within said crown wheel on said sleeve, an actuating shaft extending crosswise of said shank adjacent said crown wheels and a spur gear on said actuating shaft arranged to be selectively moved into mesh with either of said crown wheels by longitudinal movement of said actuating shaft.

4. In a device of the class described a tubular shank, a tubular sleeve rotatable within said shank, adjustable friction means connected with said sleeve, an angle support secured to the forward end of said sleeve, a post journaled in said angle support at right angles to the axis of said shank, a spotlight lamp secured to the outer end of said post, adjustable friction means connected with said post, a gear-wheel secured to the inner end of said post, a shaft journaled in said sleeve, a pinion secured to said shaft and meshing with said gearwheel on said post, a housing secured to the inner end of said shank, said sleeve and said shaft terminating within said housing, an actuating shaft journaled in said housing at right angles to the axis of said shank and gear mechanism for selectively connecting said actuating shaft with either said sleeve or said main shaft.

5. In a device of the class described a tubular shank, a tubular sleeve rotatable within said shank, adjustable friction means connected with said sleeve, an angle support secured to the forward end of said sleeve, a post journaled in said angle support at right angles to the axis of said shank, a spotlight lamp secured to the outer end of said post, adjustable friction means connected with said post, a gearwheel secured to the inner end of said post, a shaft journaled in said sleeve, a pinion secured to said shaft and meshing with said gearwheel on said post, a housing inclosing said gear mechanism, a gearwheel secured to the inner end of said sleeve, a smaller gearwheel secured to the inner end of said shaft and disposed within said gearwheel on said sleeve, a housing inclosing said gearwheels, an actuating shaft extending crosswise of said housing at right angles to said sleeve; a pinion on said actuating shaft arranged to mesh with either of said gearwheels and stop means for permitting a limited longitudinal movement of said actuating shaft within said housing to selectively move said pinions into mesh with either of said gearwheels.

Signed at Seattle, Washington, this 31st day of July, 1920.

FRANK W. REES.